Figure 1:
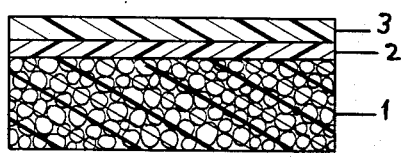

June 14, 1966     F. M. WRIGHT ET AL     3,256,133
NOVEL POLYESTER LAMINATES
Filed Aug. 14, 1963

INVENTORS
FRANCIS M. WRIGHT
and EARL E. PARKER
BY
Oscar L. Spencer
ATTORNEY

3,256,133
NOVEL POLYESTER LAMINATES

Francis M. Wright, Shelby, N.C., and Earl E. Parker, Allison Park, Pa., assignors to Pittsburgh Plate Glass Company, Pittsburgh, Pa., a corporation of Pennsylvania
Filed Aug. 14, 1963, Ser. No. 302,126
11 Claims. (Cl. 161—160)

This invention relates to laminates of styrene polymers prepared by coating a polymeric styrene substrate with a polyurethane coating composition and then applying to the polyurethane coating a low-temperature curing, unsaturated polyester resin containing up to about 25 percent by weight of styrene or methyl methacrylate or mixtures thereof.

Foams of styrene polymers have found utility in many applications and are frequently produced from small beads or capsules of styrene polymers by the sealing of an appropriate quantity of such beads in a mold and injecting steam into the mold cavity to cause expansion and adhesion of the beads. U.S. Patent No. 3,088,925 describes in detail a method of forming beads of styrene polymers, wherein the styrene polymers may be homopolymers of styrene or copolymers of styrene and other $CH_2=C<$ monomers, as for example, methyl methacrylate. Particular applications for polymeric styrene foams include their use in insulated articles, such as beverage coolers, building panels and the like, and in buoyant articles, including boats, surfboards, buoys, and the like. Foams of styrene polymers are particularly useful for such articles inasmuch as they possess a low density and excellent insulative quality.

One disadvantage of polymeric styrene foams, however, resides in the lack of a tough outer-skin on the foam. This is particularly disadvantageous when the foam is used in the construction of building panels, boats, and similar articles which receive severe abuse. To overcome this problem, hard coatings of various types have been utilized to protect the foam. At the present, one of the more widely used coatings for such articles is based on epoxide resins. Epoxy coatings, reinforced or unreinforced, possess excellent strength and adhesion to the foam; however, epoxy coatings possess some disadvantages, as for example, many of the catalysts utilized for curing the epoxy resins are toxic; also, epoxy resins which are curable at room temperature are relatively unstable. Furthermore, the epoxy resins generally have poor color and are relatively expensive.

Coatings of unsaturated polyester resins are desirable in that they do not utilize toxic ingredients, are relatively stable, and the cured polyester resins do not contribute an undesirable color to finished coatings. Heretofore, however, coatings of unsaturated polyester resins, reinforced or unreinforced, have not been successfully utilized as a covering for polystyrene articles. Although polyester resins do possess the above-mentioned advantages and have comparable physical properties to epoxy resins, such as, tensile strength, flexural strength, and the like, their use on polystyrene substrates presented several problems.

Generally, polyesters utilized for reinforcement purposes are of a medium to high molecular weight requiring a considerable quantity of solvent to reduce the viscosity to a range suitable for brushing or spraying application techniques. Also, the solvent must be one capable of cross-linking the polyester molecules if optimum physical properties are to be obtained. Thus, because of the high viscosity of the polyester and the importance of adequate cross-linking upon final physical properties, conventional polyester resins generally contain about 30 to 60 percent by weight of a $CH_2=C<$ monomer such as styrene or vinyl toluene polymerizable with the unsaturated polyester resin.

Furthermore, when a polyester resin is used to coat a thermoplastic, heat-sensitive substrate such as polystyrene foam, the polyester resin must be capable of curing at temperatures of less than about 150° F. Of the presently available cross-linking monomers, only styrene and methyl methacrylate have been found effective to cross-link an unsaturated polyester resin at such low temperatures. Styrene and methyl methacrylate, however, are also excellent solvents for polymers of styrene, thus, unsaturated polyester resins containing 30 percent by weight or more of styrene attack the polystyrene foam severely and dissolve the foam causing large voids beneath the cured polyester coating, which is an unacceptable condition in laminated foam articles.

In copending application, Serial No. 302,125, filed August 14, 1963, now abandoned, it is disclosed that low-temperature curing, unsaturated polyesters containing from about 15 percent by weight to about 25 percent by weight styrene or methyl methacrylate can be effectively utilized as a coating for polymeric styrene foam articles without excessive degradation of the foam by attack from styrene or methyl methacrylate.

It has now been discovered that the attack caused by a coating of low-temperature curing, unsaturated polyester resin containing styrene or methyl methacrylate, or mixtures thereof, can be even further minimized, especially in completely encapsulated articles, by coating the polymeric styrene foam with a thin layer of a polyurethane coating prior to the polyester coating.

It is surprising that a thin layer of polyurethane resin adequately protects the polymeric styrene foam from attack by the styrene or methyl methacrylate contained in the unsaturated polyester resin inasmuch as these monomers generally remove organic resinous coatings, such as alkyds and lacquers of various types. The foam laminates prepared in the manner of this invention, however, have evidenced substantially no attack upon the resinous styrene polymer foam even in articles completely encapsulated by polyester resins containing styrene or methyl methacrylate, or mixtures thereof.

POLYESTER COMPONENT

The polyester resins useful in this invention can be produced in the usual manner of esterifying an alpha, beta-ethylenically unsaturated polycarboxylic acid wherein the term "acid" as used in this specification and appended claims is intended to include corresponding anhydrides, where such anhydrides exist, such as maleic acid or anhydride and the like, with a suitable polyol, such as ethylene glycol and the like, and including optionally an aromatic unsaturated polycarboxylic acid such as phthalic acid or anhydride and the like which performs as a saturated polycarboxylic acid. Preferably the aromatic unsaturated polycarboxylic acid is utilized in quantities of up to about 0.7 mole per mole of unsaturated polycarboxylic acid. It is generally preferred, however, to include also a small amount of a monocarboxylic acid to effectively terminate the polyester chain when the polyester is formed by use of an excess of polyol, thereby producing relatively low molecular weight resins; one such ingredient is benzoic acid; others include n-hexanoic acid, n-acetanoic acid, n-decanoic acid and the like.

When an excess of polycarboxylic acid is utilized in preparing low molecular weight polyesters, a high boiling monohydric alcohol can be effectively utilized as a chain terminating agent. Such alcohols include benzyl alcohol, octyl alcohol, monyl alcohol and the like.

The esterification of polyesters of the above type is continued until an acid number of about 28 to 32 is obtained; however, polyesters having lower or higher acid numbers may be utilized depending upon achieving acceptable viscosity for the application technique involved. Generally, such polyesters when thinned with styrene and/or methyl methacrylate in about 15 percent by weight to about 25 percent by weight of the total resin, should have a viscosity of about 500 centipoises to about 3,000 centipoises. While these resins are low molecular weight polyesters, they nevertheless provide a hard, attractive, durable surface.

Other alpha, beta-ethylenically unsaturated polycarboxylic acids utilizable as one of the reactants to prepare polyesters of the above type include: fumaric acid, glutaconic acid, glutaconic anhydride, citraconic acid, itaconic acid, mesaconic acid, and the like.

Polyols suitable as one of the reactants for the above polyesters include: ethylene glycol, propylene glycol, butylene glycol, diethylene glycol, dipropylene glycol, triethylene glycol, glycerol, neopentyl glycol, pentaerythritol, and the like.

Aromatic unsaturated polycarboxylic acids and their corresponding anhydrides, utilizable as an optional reactant in the above polyesters include: phthalic acid, isophthalic acid, tetrahydrophthalic acid, endomethylene tetrahydrophthalic acid, tetrachlorophthalic acid, hexachloroendomethylene tetrahydrophthalic acid, and the like.

The proportion of reactants employed in preparing the unsaturated polyester resins utilized in this invention is not critical. The ratio of reactants may be varied according to the conventional procedures for producing polyester resins. Theoretically, one molar equivalent of polyol is utilized for each molar equivalent of acid. However, it is conventional practice to utilize from 5 to 20 percent excess polyol. The quantity of chain terminating ingredient utilized is from one-hundredth mole to about two-tenths mole per mole of polycarboxylic acid utilized.

Also, inhibitors are utilized in the preparation of the above polyesters. Suitable inhibitors include: quinone, hydroquinone, phenylhydrazine hydrochloride, catechol, 4-t-butyl catechol, trimethyl benzyl ammonium chloride, and the like.

Unsaturated polyester resins of the type described above can be effectively utilized as a hard, attractive, durable, protective coating for substrates and foams of styrene polymers. While unreinforced, unsaturated polyester resins have good physical properties, it is generally preferred to utilize a reinforcing agent with the unsaturated polyester resin. Some of these reinforcing agents include: glass fibers, asbestos fibers, metal fibers, sisal fibers, nylon, Dacron, and the like.

The addition of such reinforcing agents generally improves the flexural strength and tensile strength of the polyester resin. Laminates prepared from polymeric styrene foam and a reinforced polyester resin of the type described above have excellent strength and can withstand excessive physical abuse.

A more comprehensive description of polyester preparation, raw materials, catalysts, inhibitors, and the like, can be found in "Polyesters and Their Applications," by Johan Bjorksten, Reinhold Publishing Company (1956), pages 21–97.

POLYURETHANE COMPONENT

Polyurethane coatings useful in the practice of this invention can be prepared from one of several types of polyurethane resins, such as (1) polyurethane resins having excess isocyanato groups which react with moisture to cure the resin, (2) polyurethane resins of the two package type, wherein one component has an excess of isocyanato groups and the other component contains a number of groups having an active hydrogen atom, as for example, a hydroxyl group, and (3) polyurethane resins prepared from the reaction of an alcoholized drying or semidrying oil and an organic polyisocyanate, wherein the curing occurs through the unsaturation of the drying or semidrying oil.

The polyurethane resins of classes (1) and (2) generally have only moderate solubility in aliphatic type solvents such as mineral spirits; thus, the resin of class (3) are preferred inasmuch as resins of this class have excellent solubility in aliphatic solvents. The use of aliphatic solvents is generally preferred as substantially no attack results upon the polymeric styrene foam substrate.

The resins of classes (1) and (2) nevertheless very useful in this invention as coatings of these resins are frequently applied by spraying techniques wherein the solids content in the solvent is low, that is, about 5 percent to 15 percent by weight. Thus, these resins can be applied at low solids content from aliphatic hydrocarbon solvents to form useful coatings.

Polyurethane resins of the moisture curing type can be prepared from a polymer having at least two groups possessing active hydrogen atoms, such as, hydroxyl rich polyesters of polyethers, and an organic polyisocyanate, such as tolylene diisocyanate, wherein it is preferred that the isocyanato group be present in about 110 percent to 200 percent of the theoretical requirement. The resulting resin has numerous unreacted —NCO groups which undergo reaction with each other in the presence of moisture, which can even be humid air, to form a cross-linked structure. These resins have moderate solubility in aliphatic solvents and can be thinned in such solvents.

Polyurethane resins of the two component type are generally prepared as follows: one component, conventionally called a prepolymer, is prepared by reacting a substantial excess of an organic polyisocyanate with a compound having a number of groups containing an active hydrogen such as hexane triol; the other component is generally a polymer having a number of groups containing an active hydrogen, such as hydroxyl rich polyester or polyether, and the like. These two components are stored in separate containers until time for use, then the two components are admixed and applied to a substrate in a conventional manner. The —NCO groups of the prepolymer react with the active hydrogens of the other component effectively crosslinking the parent compounds into a strong, durable coating. Each of these components has moderate solubility in aliphatic solvents and can be thinned in such. The two component systems are frequently catalyzed with a metal drier such as cobalt octoate, cobalt naphthenate, stannous octoate, and the like, to promote rapid curing.

The polyurethane coatings or isocyanate-modified oil compositions of class (3) which are utilized in this invention, are those urethane oils which are produced by reacting an alcoholized drying or semi-drying vegetable or marine oil, or an oil acid of such an oil, with an organic polyisocyanate. These isocyanate-modified oil compositions are extensively known and used in the art. Included among the oils which are thus used in producing urethane oils are linseed oil, perilla oil, safflower oil, soybean oil, tung oil, castor oil, dehydrated castor oil, oiticica oil, and similar oils, as well as oil acids of such oils.

A further description of drying and semi-drying oils may be found in "Organic Coating Technology," vol. I, by H. F. Payne, John Wiley and Sons, Inc., chapter 2.

In producing the urethane oils, the drying or semi-drying oil is alcoholized with a polyol and subsequently reacted with an organic isocyanate. Any polyol conventionally employed to produce urethane oils can be used to produce isocyanate-modified oil compositions. The polyols used include ethylene glycol, propylene glycol, hexamethylene glycol, pinacol, glycerol, trimethylolpropane, hexanetriol, erythritol, pentaerythritol, mannitol, and other polyhydroxy alcohols having, for example, 2 to 10 hydroxy groups and 2 to 20 carbon atoms, as well as resinous polyols such as unsaturated aliphatic alcohol polymers and copolymers, as for example, homopolymers of unsaturated aliphatic alcohols having 2 to 10 carbon atoms, such as allyl alcohol or methallyl alcohol, and copolymers of such alcohols with ethylenically unsaturated monomers, such as styrene or acrylonitrile.

A catalyst is sometimes employed in making urethane oils; as for example, litharge, tin salts and calcium salts are often used. When thus employed, the catalyst is present in ordinary catalytic quantities, usually about 0.01 percent to about 1 percent or more by weight.

In producing the urethane oils, the temperatures of reaction, as well as the proportions of the oil, alcohol and isocyanate, are those which are normally used and can be varied widely, depending upon the particular reactants and the particular composition desired. Generally speaking, temperatures between 100° C. and about 250° C. are employed for the alcoholysis reaction. The reaction with the isocyanate is generally carried out between 35° C. and 125° C. Usually the oil and the alcohol are reacted in an oil to alcohol weight ratio between about 3 to 1 and about 25 to 1, and this product is reacted with about 0.5 percent to 50 percent by weight of the organic isocyanate.

Organic polyisocyanates conventionally utilized in the preparation of the polyurethane coatings described above include the following:

hexamethylene diisocyanate
cyclohexyl-1,4-diisocyanate
tolylene dissocyanate
diphenyl methane-4,4'-diisocyanate
biphenyl-4,4'-diisocyanate
naphthylene diisocyanates
1,2,4-benzene triisocyanate
butane-1,2,2-triisocyanate
triphenyl diisocyanate
ethylene diisocyanate
chlorophenyl-2,4-diisocyanate and the like.

Mixtures of the organic polyisocyanates are widely used throughout the polyurethane resin industry and, for many applications, such mixtures are frequently preferred. Such mixtures include:

(a) An 80:20 mixture of the 2,4-isomer and 2,6-isomer of tolylene diisocyanate;

(b) A mixture of polyisocyanates having an average NCO content of 31 percent, an average equivalent weight of 135 and the following representative structure

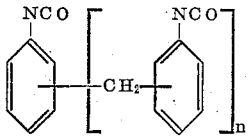

wherein $n$ has an average value of 1.5;

(c) A mixture of polyisocyanates having an average NCO equivalent of 135 and the following representative structure

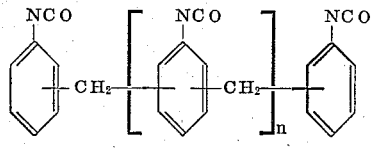

and the like.

LAMINATE PREPARATION

A strong, durable laminate of a polymeric styrene foam, a pigmented or unpigmented polyurethane coating of the type described above, and a reinforced or unreinforced polyester resin of the type described above, such as a benzoic acid terminated diethylene glycol maleate polyester, can be prepared in the following manner:

(1) The polyester is thinned in about 15 percent to 25 percent by weight of styrene and/or methyl methacrylate, although less solvent may be utilized when the polyester has a correspondingly lower molecular weight.

(2) A suitable polymerization catalyst is added to the polyester resin. Such catalysts include: benzoyl peroxide, methylethyl ketone peroxide, cumene hydroperoxide, lauroyl peroxide, tertiary butyl hydroperoxide, and the like.

Catalysts are generally added in quantities of about 0.5 percent to about 2 percent by weight of the total polyester resin.

(3) A polyurethane coating composition, such as an isocyanate-modified drying or semidrying oil of the type described above, preferably containing a drier such as cobalt, cobalt naphthenate, cobalt octoate, and the like, and thinned in mineral spirits or other aliphatic solvent to a viscosity suitable for brushing or spraying, is then coated upon the substrate of a styrene polymer by an appropriate method to a thickness of about 1 mil to about 10 mils. If desired, the polyurethane coating can be heated to temperatures of up to 150° F. for about one-half hour to facilitate curing, although curing can be effected at room temperature, that is about 60° F. in about 3 hours. Polyurethane coatings of these thicknesses provide adequate protection for the polymeric styrene substrate from styrene attack, however, thicker coatings can be applied if desired.

(4) After the polyurethane coating has cured, the $CH_2=C<$ monomer-thinned, catalyzed polyester resin, preferably containing an accelerator such as cobalt salts, t-aromatic amines, and the like, is then applied by an appropriate method; as for example, by brushing, spraying, or immersion of the article in a bath of polyester resin.

The polyester resin may, of course, be either reinforced or unreinforced, and can be applied in thicknesses of about 20 mils to about 1 inch. The thickness of the outer coating is generally predicated upon the amount of abuse the completed article will be subjected to, however, for most purposes a thickness of about 50 mils is suitable.

(5) The coated article is then cured at room temperature for about 24 hours, although the curing is preferably conducted at temperatures of about 100° F. to 150° F. for a period of about one-half hour to about 3 hours. If the laminate is to be cured at temperatures less than about 130° F., then it is preferred to utilize styrene as the $CH_2=C<$ monomer or mixtures of methyl methacrylate and styrene wherein the predominent monomer is styrene.

Laminates of polymeric styrene foam produced in the above manner exhibit excellent physical properties. Attack by styrene or methyl methacrylate upon the polymeric styrene foam is negligible as the polyurethane coating effectively resists these solvents even when the foam article is completely encapsulated with a polyester resin containing styrene or methyl methacrylate. These laminates can withstand severe abuse as there are no voids beneath the surface of the polyester coating; thus, the polyester layer has good sub-surface support and is not susceptible to being easily punctured.

The adhesion of the protective outer coating to the resinous styrene polymer substrate is improved when the polyurethane coating contains a pigment. Such pigments include barytes, kaolin, alkyl ammonium montmorillonites, dimethyldioctadecyl ammonium bentonite, iron oxide, lithopone, rutile, zinc oxide, and the like. For purposes of improving adhesion, it is generally preferred that pigment be added to the polyurethane resin in quantities of about 0.5 percent to about 5 percent by weight of the weight of the resin.

Laminates of polymeric styrene foam prepared as above utilizing a non-pigmented polyurethane resin provide less adhesion than pigmented polyurethane barrier coats. However, laminated articles of the type described above, having a non-pigmented barrier coat are nevertheless extremely useful, for in articles completely encapsulated with a polyester protective layer, adhesion is of minor importance as a completely encapsulated article can move very little in any direction relative to the protective outer layer. Thus, so long as there is no solvent attack, the foam article must remain in contact with the outer coating, thereby providing sub-surface support.

The laminates prepared in accordance with this invention may be provided with a decorative outer coating by pigmenting the reinforced or unreinforced unsaturated polyester resin. Such pigments include chrome greens, chrome yellows, iron oxide black, iron oxide red, ultramarine, Prussian blue, zinc oxide, lithopone, titanium dioxide, and the like. A decorative coating may also be provided by painting the outer protective layer with an appropriate decorative paint, such as pigmented alkyd and the like.

Reference is now directed to FIGURE 1 wherein numeral 1 indicates the polymeric styrene foam substrate, numeral 2 indicates a polyurethane coating, and 3 indicates an unreinforced, unsaturated polyester resin coating.

Figure 2:
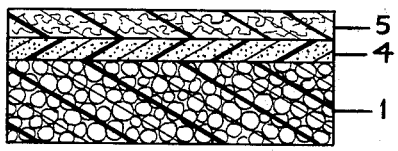

FIGURE 2 depicts a laminate of a polymeric styrene foam 1, a pigmented polyurethane coating 4, and a glass fiber reinforced, unsaturated polyester resin coating 5.

The following examples illustrate in detail methods of preparing useful polymeric styrene laminates. The examples are not intended to limit the invention, however, for there are, of course, numerous possible variations and modifications.

*Example I*

An unsaturated polyester resin was prepared from the following ingredients:

| | |
|---|---|
| Maleic anhydride _____moles__ | 10 |
| Diethylene glycol _____do____ | 11 |
| Benzoic acid _____do____ | 0.5 |
| Hydroquinone _____percent by weight__ | 0.02 |

The above ingredients were heated to a temperature of about 400° F. in a reaction vessel equipped with a temperature measuring device, agitator, reflux condenser and inert gas inlet near the bottom of the vessel. The reaction mixture was purged with inert gas at a rate sufficient to remove the water of reaction from the vessel.

The reaction was continued until the acid number was about 28 to about 32. The reaction mixture was then cooled to about 200° F. and thinned with sufficient styrene to obtain a solids content of about 80 percent by weight of polyester.

*Example II*

A mixture of 1471 parts linseed oil, 102 parts glycerol, 172 parts pentaerythritol, and 0.6 part of stannous fluoride were heated to about 235° C. for 2 hours. After cooling to 150° C., 197 parts phthalic anhydride and about 60 parts xylene were added. The mixture was then heated to about 215° C. for 4 hours during which time a total of about 95 parts of water were removed. The reaction mixture, which then had an acid number of 1.0, was cooled and 1808 parts mineral spirits and 404 parts of tolylene diisocyanate were added. After heating for about 2 and one-half hours to 95–100° C., the mixture was allowed to cool and 2.5 parts distilled water were added. After filtration the product had the following properties:

| | |
|---|---|
| Viscosity Gardner-Holdt) _____ | V–X. |
| Color Gardner) _____ | 7. |
| Acid number _____ | less than 1.0. |
| Density (lbs. per gallon) _____ | 7.6. |
| Hydroxy value _____ | less than 50. |
| Solids (percent) _____ | 55. |
| Isocyanate groups _____ | none detected. |

*Example III*

A polymeric styrene foam surfboard, about 2 ft. x 1 ft. x 2 in. was coated with a polyurethane coating of the type prepared in Example II containing about 2 percent by weight of a dimethyldioctadecyl ammonium bentonite filler, to a thickness of about 5 mils. This coating was permitted to dry for about 2 hours. A reinforced, unsaturated polyester resin of the type prepared in Example I was applied to a thickness of about 1/16 inch. The totally encapsulated article was cured in an oven for one hour at about 150° F.

The laminated article was cut and inspected. Adhesion between the various layers was excellent and no voids were present in tthe polymeric styrene foam indicating complete absence of styrene attack.

The outer surface was hard and exhibited excellent resistance to abrasion and to puncturing.

*Example IV*

A methyl methacrylate-thinned polyester resin was prepared by thinning an unsaturated polyester of the type prepared in Example I in sufficient methyl methacrylate to obtain a resin having a solids content of about 80 percent by weight of polyester.

*Example V*

A laminate was prepared by coating a polymeric styrene foam slab with a polyurethane coating of the type prepared in Example II containing about 2 percent by weight of a dimethyldioctadecyl ammonium bentonite filler. The resulting coating was about 5 mils thick and dried in about 2 hours. A glass fiber reinforced, unsaturated polyester resin of the type prepared in Example IV was applied to a thickness of about 1/16 inch. The totally encapsulated article was cured in an oven for about 2 hours at about 150° F.

The laminated article had a hard outer surface which exhibited excellent resistance to abrasion and puncturing. Also, interlayer adhesion was excellent and no voids were present in the foam substrate, indicating complete absence of styrene attack.

Similar results occur when polyesters prepared by substituting fumaric acid and/or dipropylene glycol, respectively, for the maleic acid and diethylene glycol in the polyester of Example I was utilized as a protective coating in the above example.

Also, similar results are obtained when mixtures of methyl methacrylate and styrene are utilized as the solvent for the various polyesters utilized in the above example. As for example, a 1:1 admixture of the polyester resin of Example I and the polyester resin of Example IV produces a useful laminate when utilized in the preparation outlined in Example V.

Although specific examples of the invention have been set forth hereinabove, it is not intended that the invention be limited solely thereto, but to include all of the variations and modifications falling within the scope of the appended claims.

We claim:

1. A laminate comprising (1) a substrate of a cellular resinous polymer of styrene, (2) a polyurethane coating adherent upon the polymeric styrene substrate, and (3) an unsaturated polyester resin containing from about 15 percent by weight to about 25 percent by weight of a $CH_2=C<$ monomer selected from the class consisting of styrene, methyl methacrylate, and mixtures of styrene and methyl methacrylate, adherent upon the polyurethane coating.

2. A laminate comprising (1) a substrate of a cellular resinous polymer of styrene, (2) a pigmented polyurethane coating adherent upon the cellular substrate, and (3) a low-temperature curing, unsaturated polyester resin containing from about 15 percent by weight to about 25 percent by weight of a $CH_2=C<$ monomer selected from the class consisting of styrene, methyl methacrylate and mixtures of styrene and methyl methacrylate, adherent upon the polyurethane coating.

3. A laminate comprising (1) a substrate of a cellular resinous polymer of styrene, (2) a coating of a mineral spirits soluble, polyisocyanate modified oil selected from the class consisting of drying oils and semi-drying oils adherent upon the cellular substrate, and (3) a low-temperature curing, unsaturated polyester resin contained from about 15 percent by weight to about 25 percent by weight of a $CH_2=C<$ monomer selected from the class consisting of styrene, methyl methacrylate, and mixtures of styrene and methyl methacrylate, adherent upon the polyisocyanate modified oil coating.

4. A laminate comprising (1) a substrate of a cellular resinous polymer of styrene, (2) a polyurethane coating adherent upon the cellular substrate, and (3) a low-temperature curing, unsaturated polyester resin comprising (a) an unsaturated polyester having an acid number of about 28 to about 32 and (b) from about 15 percent to about 25 percent by weight of a $CH_2=C<$ monomer selected from the class consisting of styrene, methyl methacrylate and mixtures of styrene and methyl methacrylate, adherent upon the polyurethane coating.

5. A laminate comprising (1) a substrate of a cellular resinous polymer of styrene, (2) a polyurethane coating of about 1 mil to about 10 mils adherent upon the cellular substrate, and (3) a low-temperature curing, unsaturated polyester resin comprising (a) the esterification product of an unsaturated polycarboxylic acid selected from the class consisting of maleic acid and fumaric acid, and a polyol selected from the class consisting of diethylene glycol and dipropylene glycol, and (b) from about 15 percent by weight to about 25 percent by weight of a $CH_2=C<$ monomer selected from the class consisting of styrene, methyl methacrylate and mixtures of styrene and methyl methacrylate, adherent upon the polyurethane coating.

6. The laminate of claim 5 wherein the polyurethane coating is a pigmented, mineral spirits soluble, polyisocyanate modified oil selected from the class consisting of drying oils and semidrying oils.

7. A laminate comprising (1) a substrate of a cellular resinous polymer of styrene, (2) a polyurethane coating adherent upon the cellular substrate, and (3) a low-temperature curing, unsaturated polyester resin containing from about 15 percent by weight to about 25 percent by weight of a $CH_2=C<$ monomer selected from the class consisting of styrene, methyl methacrylate and mixtures of styrene and methyl methacrylate, and having a viscosity of about 500 centipoises to about 3,000 centipoises, adherent upon the polyurethane coating.

8. A method of forming a durable laminate by (a) coating a substrate of a cellular resinous polymer of styrene with a polyurethane coating composition to a thickness of about 1 mil to about 10 mils, (b) curing said polyurethane coating by subjecting it to a temperature of about 60° F. to about 150° F. for a period of about one-half hour to about 3 hours, (c) coating the polyurethane coating with a low-temperature curing, unsaturated polyester resin to a thickness of about 20 mils to about 1 inch, said polyester resin containing a $CH_2=C<$ monomer selected from the class consisting of styrene, methyl methacrylate and mixtures of styrene and methyl methacrylate, a polymerization catalyst and a polymerization accelerator, and (d) curing the polyester coating by heating the coated article to a temperature of about 100° F. to about 150° F. for a period of about one-half hour to about 3 hours.

9. The method of claim 8 wherein the low-temperature curing, unsaturated polyester resin comprises (1) an unsaturated polyester having an acid number of about 28 to about 32 and (2) from about 15 percent to about 25 percent by weight of a $CH_2=C<$ monomer selected from the class consisting of styrene, methyl methacrylate and mixtures of styrene and methyl methacrylate, and (3) a polymerization catalyst and (4) a polymerization accelerator.

10. The method of claim 8 wherein the polyurethane coating is a mineral spirits soluble, polyisocyanate modified oil selected from the class consisting of drying oils and semi-drying oils.

11. The method of claim 8 wherein the low-temperature curing, unsaturated polyester resin comprises (1) the esterification product of an unsaturated polycarboxylic acid selected from the class consisting of maleic acid and fumaric acid, and a polyol selected from the class consisting of diethylene glycol and dipropylene glycol, (2) from about 15 percent by weight to about 25 percent by weight of a $CH_2=C<$ monomer selected from the class consisting of styrene, methyl methacrylate and mixtures of styrene and methyl methacrylate, (3) a polymerization catalyst, and (4) a polymerization accelerator.

References Cited by the Examiner

UNITED STATES PATENTS

| | | |
|---|---|---|
| 2,639,252 | 5/1953 | Simon et al. |
| 2,650,212 | 8/1953 | Windemuth _____ 260—75 |
| 2,865,800 | 12/1958 | Stastny _____ 161—233 |
| 2,908,602 | 10/1959 | Collardeau et al. ___ 161—233 X |
| 2,953,489 | 9/1960 | Young _____ 156—331 |
| 2,994,674 | 8/1961 | Rudkin et al. |
| 3,029,172 | 4/1962 | Glass. |
| 3,158,529 | 11/1964 | Robitschek et al. ____ 161—161 |

ALEXANDER WYMAN, *Primary Examiner.*

MORRIS SUSSMAN, *Examiner.*